US00RE49490E

(19) United States
(12) Reissued Patent
Han et al.

(10) Patent Number: US RE49,490 E
(45) Date of Reissued Patent: *Apr. 11, 2023

(54) HARQ-ACK HANDLING FOR UNINTENDED DOWNLINK SUB-FRAMES

(71) Applicant: Apple Inc., Cupertino, CA (US)

(72) Inventors: Seunghee Han, San Jose, CA (US); Hong He, Beijing (CN); Jong-Kae Fwu, Sunnyvale, CA (US)

(73) Assignee: Apple Inc., Cupertino, CA (US)

( * ) Notice: This patent is subject to a terminal disclaimer.

(21) Appl. No.: 16/931,216

(22) Filed: Jul. 16, 2020

Related U.S. Patent Documents

Reissue of:
(64) Patent No.: 15,614,192
Issued: Jun. 5, 2017
Appl. No.: 10/027,446
Filed: Jul. 17, 2018

U.S. Applications:
(63) Continuation of application No. 14/723,809, filed on May 28, 2015, now Pat. No. 9,673,939, which is a
(Continued)

(51) Int. Cl.
*H04L 1/18* (2006.01)
*H04W 36/22* (2009.01)
(Continued)

(52) U.S. Cl.
CPC ..... *H04L 1/1861* (2013.01); *H04L 1/0025* (2013.01); *H04L 1/0026* (2013.01);
(Continued)

(58) Field of Classification Search
CPC ..... H04W 52/0245
See application file for complete search history.

(56) References Cited

U.S. PATENT DOCUMENTS 8,830,883 B2 * 9/2014 Chen ..... H04L 5/0053 370/280
8,885,479 B2 * 11/2014 Damnjanovic ..... H04L 5/0042 370/236
(Continued)

FOREIGN PATENT DOCUMENTS

AU 2015249093 11/2015
AU 2015249093 B2 9/2016
(Continued)

OTHER PUBLICATIONS

SIPO, CN2013102745989, Search Report, dated Mar. 17, 2016. (Year: 2016).*
(Continued)

*Primary Examiner* — Luke S Wassum
(74) *Attorney, Agent, or Firm* — Kowert, Hood, Munyon, Rankin & Goetzel, P.C.

(57) ABSTRACT

Disclosed in some examples is a method for providing a HARQ response in an LTE network for a PUCCH format 1b. The method includes receiving one or more downlink assignments of a bundling window over a wireless downlink control channel; setting a reception status for each sub-frame of a downlink data channel in the bundling window based on whether the sub-frame on the downlink data channel was associated with a particular one of the received downlink assignments and based upon whether the sub-frame was successfully received; setting a reception status of sub-frames of the downlink data channel in the bundling window that did not have a corresponding downlink assignment to a predetermined value; and transmitting a response, the
(Continued)

response based upon the reception statuses set by the response module.

18 Claims, 10 Drawing Sheets

Related U.S. Application Data continuation of application No. 14/605,311, filed on Jan. 26, 2015, now Pat. No. 9,106,420, which is a continuation of application No. 13/721,458, filed on Dec. 20, 2012, now Pat. No. 8,958,331.

(60) Provisional application No. 61/667,325, filed on Jul. 2, 2012.

(51) Int. Cl.

| | |
|---|---|
| ***H04L 5/14*** | (2006.01) |
| ***H04L 1/00*** | (2006.01) |
| ***H04W 68/00*** | (2009.01) |
| ***H04W 48/12*** | (2009.01) |
| ***H04W 4/70*** | (2018.01) |
| ***H04W 52/38*** | (2009.01) |
| ***H04L 1/16*** | (2006.01) |
| ***H04L 5/00*** | (2006.01) |
| ***H04W 28/08*** | (2009.01) |
| ***H04W 24/10*** | (2009.01) |
| ***H04W 72/04*** | (2009.01) |
| ***H04W 52/02*** | (2009.01) |
| ***H04W 72/00*** | (2009.01) |
| ***H04W 92/02*** | (2009.01) |
| ***H04L 1/1829*** | (2023.01) |
| ***H04L 1/1607*** | (2023.01) |
| ***H04L 1/1812*** | (2023.01) |
| ***H04L 1/1867*** | (2023.01) |
| ***H04W 72/0446*** | (2023.01) |
| ***H04W 72/044*** | (2023.01) |
| *H04W 28/02* | (2009.01) |
| *H04W 88/08* | (2009.01) |

(52) U.S. Cl.

CPC ..... *H04L 1/1628* (2013.01); *H04L 1/1812* (2013.01); *H04L 1/1854* (2013.01); *H04L 1/1887* (2013.01); *H04L 5/0048* (2013.01); *H04L 5/0053* (2013.01); *H04L 5/0055* (2013.01); *H04L 5/0073* (2013.01); *H04L 5/14* (2013.01); *H04W 4/70* (2018.02); *H04W 24/10* (2013.01); *H04W 36/22* (2013.01); *H04W 48/12* (2013.01); *H04W 52/0206* (2013.01); *H04W 52/0209* (2013.01); *H04W 52/0212* (2013.01); *H04W 52/0245* (2013.01); *H04W 52/383* (2013.01); *H04W 68/00* (2013.01); *H04W 72/005* (2013.01); *H04W 72/042* (2013.01); *H04W 72/046* (2013.01); *H04W 72/0413* (2013.01); *H04W 72/0446* (2013.01); *H04W 92/02* (2013.01); *H04W 28/0205* (2013.01); *H04W 88/08* (2013.01); *Y02D 30/70* (2020.08); *Y02E 40/60* (2013.01)

(56) References Cited

U.S. PATENT DOCUMENTS

| | | | | |
|---|---|---|---|---|
| 8,958,331 | B2 | 2/2015 | Han et al. | H04W 72/0413 370/252 |
| 9,106,420 | B2 | 8/2015 | Han et al. | H04L 5/0048 |
| 9,185,736 | B2 | 11/2015 | Wei | |
| 9,191,932 | B2 * | 11/2015 | Park | H04W 72/0406 |
| 9,246,620 | B2 * | 1/2016 | Yang | H04L 1/1864 |
| 9,307,525 | B2 * | 4/2016 | Lee | H04W 72/0453 |
| 9,344,999 | B2 * | 5/2016 | Lee | H04L 5/0055 |
| 9,369,994 | B2 * | 6/2016 | Lee | H04W 72/0413 |
| 9,673,939 | B2 | 6/2017 | Han et al. | H04L 1/0026 |
| 10,027,446 | B2 * | 7/2018 | Han | H04W 4/70 |
| 2010/0165939 | A1 | 7/2010 | Lin | |
| 2010/0271970 | A1 * | 10/2010 | Pan | H04L 1/0029 370/252 |
| 2011/0116457 | A1 | 5/2011 | Damnjanovic et al. | |
| 2011/0134968 | A1 * | 6/2011 | Han | H04L 5/0023 375/146 |
| 2011/0149774 | A1 | 6/2011 | Chen et al. | |
| 2011/0194443 | A1 | 8/2011 | Li et al. | |
| 2011/0280164 | A1 * | 11/2011 | Luo | H04L 5/001 370/281 |
| 2011/0310759 | A1 * | 12/2011 | Gerstenberger | H04L 5/0057 370/252 |
| 2011/0310820 | A1 * | 12/2011 | Liao | H04L 5/0055 370/329 |
| 2012/0050176 | A1 | 3/2012 | Chin | |
| 2012/0069778 | A1 | 3/2012 | Zhang et al. | |
| 2012/0113876 | A1 | 5/2012 | Li et al. | |
| 2012/0230268 | A1 * | 9/2012 | Marinier | H04W 74/004 370/329 |
| 2012/0269103 | A1 | 10/2012 | Papasakellariou et al. | H04L 1/1621 370/280 |
| 2012/0320805 | A1 | 12/2012 | Yang et al. | |
| 2013/0034073 | A1 * | 2/2013 | Aiba | H04L 1/1887 370/329 |
| 2013/0114575 | A1 * | 5/2013 | Fu | H04L 5/0053 370/336 |
| 2013/0215865 | A1 | 8/2013 | Lee et al. | |
| 2013/0281020 | A1 * | 10/2013 | Montemurro | H04W 76/16 455/41.2 |
| 2013/0301433 | A1 | 11/2013 | Yin et al. | |
| 2013/0322357 | A1 * | 12/2013 | He | H04W 28/12 370/329 |
| 2013/0322358 | A1 | 12/2013 | He et al. | |
| 2013/0336160 | A1 * | 12/2013 | Yin | H04L 5/0055 370/254 |
| 2013/0343312 | A1 | 12/2013 | Lv et al. | |
| 2014/0003302 | A1 | 1/2014 | Han et al. | H04W 52/0212 370/280 |
| 2014/0003452 | A1 * | 1/2014 | Han | H04L 1/1657 370/474 |
| 2014/0050176 | A1 | 2/2014 | Lin | |
| 2014/0169315 | A1 | 6/2014 | Han et al. | |
| 2014/0233541 | A1 * | 8/2014 | Kim | H04L 1/1607 370/336 |
| 2014/0362746 | A1 * | 12/2014 | Yang | H04L 1/1861 370/280 |
| 2014/0369290 | A1 * | 12/2014 | Yang | H04L 1/0073 370/329 |
| 2015/0043462 | A1 * | 2/2015 | Hwang | H04L 1/1671 370/329 |
| 2015/0085714 | A1 * | 3/2015 | Liang | H04L 1/1614 370/280 |
| 2015/0117271 | A1 * | 4/2015 | Liang | H04L 5/001 370/280 |
| 2015/0117272 | A1 * | 4/2015 | Gao | H04L 1/1861 370/280 |
| 2015/0131496 | A1 | 5/2015 | Han et al. | |
| 2015/0156762 | A1 | 6/2015 | Hwang et al. | |
| 2015/0263826 | A1 | 9/2015 | Han et al. | |

FOREIGN PATENT DOCUMENTS

| | | |
|---|---|---|
| CN | 101771513 | 7/2010 |
| CN | 101771513 A | 7/2010 |
| CN | 101873630 | 10/2010 |
| CN | 101873630 A | 10/2010 |
| CN | 101946447 | 1/2011 |
| CN | 102415193 | 4/2012 |
| CN | 102415193 A | 4/2012 |
| CN | 106850129 | 6/2017 |

(56) References Cited

FOREIGN PATENT DOCUMENTS

| | | | | |
|---|---|---|---|---|
| CN | 106850129 | A | 6/2017 | |
| EP | 2639984 | | 9/2013 | |
| EP | 2639984 | A2 * | 9/2013 | ..... H04W 72/1284 |
| JP | 6050482 | | 12/2016 | |
| JP | 6050482 | B2 | 12/2016 | |
| KR | 1020150002897 | | 1/2015 | |
| KR | 1020150002897 | A | 1/2015 | |
| KR | 101702397 | B1 | 1/2017 | |
| KR | 101702397 | | 2/2017 | |
| RU | 2592872 | | 7/2016 | |
| RU | 2592872 | C2 | 7/2016 | |
| TW | I354467 | B | 12/2001 | |
| TW | 200620882 | | 6/2006 | |
| TW | 200620882 | A | 6/2006 | |
| TW | 200718251 | | 5/2007 | |
| TW | 200718251 | A | 5/2007 | |
| TW | 201025914 | | 7/2010 | |
| TW | 201025914 | A | 7/2010 | |
| TW | I326998 | | 7/2010 | |
| TW | I326998 | B | 7/2010 | |
| TW | I347762 | | 8/2011 | |
| TW | I347762 | B | 8/2011 | |
| TW | I349495 | | 9/2011 | |
| TW | I349495 | B | 9/2011 | |
| TW | I354467 | | 12/2011 | |
| TW | I517625 | | 1/2016 | |
| TW | I517625 | B | 1/2016 | |
| TW | 201607268 | | 2/2016 | |
| TW | 201607268 | A | 2/2016 | |
| WO | WO-2010002305 | | 1/2010 | |
| WO | WO-2010002305 | A1 | 1/2010 | |
| WO | WO-2010019088 | | 2/2010 | |
| WO | WO-2010019088 | A1 | 2/2010 | |
| WO | WO-2012064154 | | 5/2012 | |
| WO | WO-2012064154 | A2 | 5/2012 | |
| WO | WO-2012068141 | | 5/2012 | |
| WO | WO-2012068141 | A1 | 5/2012 | |
| WO | WO-2012070831 | | 5/2012 | |
| WO | WO-2012070831 | A2 | 5/2012 | |
| WO | WO-2012081920 | | 6/2012 | |
| WO | WO-2012081920 | A2 * | 6/2012 | ..... H04L 1/1861 |
| WO | WO-2014007960 | | 1/2014 | |
| WO | WO-2014007960 | A1 | 1/2014 | |

OTHER PUBLICATIONS

SIPO, CN2013102745989, First Action, dated Mar. 28, 2016. (Year: 2016).*

Intel Corporation "Draft CR of TDD HARQ-ACK Procedure for PUCCH Format 1b with Channel Selection in Carrier Aggregation", 3GPP TSG-WG1 Meeting #70, Qingdao, China, R1-123156, uploaded Aug. 5, 2012. (Year: 2012).*

Intel Corporation et al. "TDD HARQ-ACK Procedure for PUCCH Format 1b with Channel Selection in Carrier Aggregation", 3GPP TSG-RAN WG1 Meeting #70, Qingdao, China, R1-123873, uploaded Aug. 17, 2012. (Year: 2012).*

3GPP "3rd Generation Partnership Project; Technical Specification Group Radio Access Network; Evolved Universal Terrestrial Radio Access (E-UTRA); Physical Layer Procedures (Release 10)", 3GPP TS 36.213 V1 0.7.0, Sep. 2012. (Year: 2012).*

3GPP "Final Report of 3GPP TSG RAN WG1 #70 v1.0.0", 3GPP TSG RAN WG1 Meeting #70bis, San Diego, USA, R1-124046, uploaded Oct. 3, 2012. (Year: 2012).*

"Taiwanese Application Serial No. 104135843, Office Acion dated Dec. 14, 2016", w/ English Claims, 13 pgs.

"Taiwanese Application Serial No. 104135843, Response filed Mar. 7, 2017 to Office Acion dated Dec. 14, 2016", w/ English Translation, 39 pgs.

Asustek, "DRX retransmission missing for TDD", 3GPP Draft; R2-100226 DRX Retransmission Missing for Tdd, 3rd Generation Partnership Project (3GPP), Mobile Competence Centre ; 650, Route Des Lucioles ; F-06921 Sophia-Antipolis Cedex ; France, vol. Ran Wg2, No. Valencia, Spain, (Jan. 12, 2010), 4 pgs.

Catt, et al., "Way forward on HARQ-ACK transmission for TDD inter-band CA", 3gpp Draft; R1-122966, 3rd Generation Partnership Project (3GPP), Mobile Competence Centre; 650, Route Des Lucioles; F-06921 Sophia-Antipolis Cedex, (May 25, 2012).

"France Application Serial No. 1356403, Office Action dated Nov. 10, 2017", w/ English Translation, 4 pgs.

"European Application Serial No. 16191779.4, Extended European Search Report dated Jan. 17, 2017", 11 pgs.

"Japanese Application Serial No. 2015-515289, Office Action dated Jun. 21, 2016", (English Translation), 5 pgs.

"Japanese Application Serial No. 2015-515289, Response filed Sep. 21, 2016 to Office Action mailed Jun. 21, 2016", W/ English Translation of Claims, 10 pgs.

Office Action in Brazilian Application Br112014030155-7 dated Jun. 2, 2020, Informal Translation Only.

Catt, "Corrections on the notation of k and k_m", 3GPP; Draft; R1-112936, 3rd Generation Partnership Project (3GPP); 3GPP TSG-RAN WG1 Meeting #66bis; Zhuhai, China, Oct. 10-14, 2011, 16 pages.

M Taferner et al., "A Novel DOA-Based Beamforming Algorithm With Broad Nulls", International Symposium on Personal, Indoor and Mobile Radio Communication'99, Osaka, Japan, Sep. 1999.

3GPP, "3rd Generation Partnership Project; Technical Specification Group Services and System Aspects; Multimedia Broadcast/Multicast Service (MBMS) Selection and Characterisation of Application Layer FEC (Release 11)", 3GPP Draft; 26947-100, 3rd Generation Partnership Project (3GPP); Jun. 20, 2012.

Jianhua Zhang et al., "Advanced International Communications", IEEE Vehicular Technology Magazine, IEEE, US, vol. 6, No. 2, doi:10.1109/MVT.2011.940800, ISSN 1556-6072.

"Correction on HARQ-ACK transmission for a UE configured with PUCCH format 3", 3GPP TSG-WG1 Meeting #73. R1-132684., (May 20, 2013), 9 pgs.

U.S. Appl. No. 14/723,809, Notice of Allowance dated Jan. 27, 2017, 7 pgs.

AU2015249093"Australian Application Serial No. 2015249093, First Examiners Report dated Mar. 8, 2016", 2 pgs.

Canadian Application Serial No. 2,874,463, Response filed Aug. 9, 2016 to Office Action dated Feb. 10, 2016, 7 pgs.

Chinese Application Serial No. 201310274598.9, Voluntary Amendment dated May 13, 2014, 3 pgs.

European Application Serial No. 13813633.8, Communication Pursuant to Article 94(3) EPC dated Jan. 17, 2017, 7 pgs.

Russian Federation Application Serial No. 2014148570, Office Action dated Oct. 26, 2015, w/ English Translation, 6 ogs.

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WGI. No. V10.6.0, (Jun. 26, 2012), 1-125.

"U.S. Appl. No. 13/721,458, Non Final Office Action dated May 23, 2014", 7 pgs.

"U.S. Appl. No. 13/721,458, Notice of Allowance dated Oct. 7, 2014", 7 pgs.

"U.S. Appl. No. 13/721,458, Preliminary Amendment filed Mar. 15, 2013", 7 pgs.

"U.S. Appl. No. 13/721,458, Response filed Aug. 20, 2014 to Non-Final Office Action dated May 23, 2014", 7 pgs.

"U.S. Appl. No. 14/605,311, Notice of Allowance dated Apr. 6, 2015", 11 pgs.

"U.S. Appl. No. 14/605,311, Preliminary Amendment filed Jan. 27, 2015", 7 pgs.

"U.S. Appl. No. 14/723,809, Non Final Office Action dated Mar. 11, 2016", 5 pgs.

"U.S. Appl. No. 14/723,809, Non Final Office Action dated Jul. 28, 2016", 5 pgs.

"U.S. Appl. No. 14/723,809, Non Final Office Action dated Oct. 7, 2015", 9 pgs.

(56) References Cited

OTHER PUBLICATIONS

"U.S. Appl. No. 14/723,809, Non Final Office Action dated Jan. 27, 2017", 7 pgs.
"U.S. Appl. No. 14/723,809, Preliminary Amendment filed May 29, 2015", 6 pgs.
"U.S. Appl. No. 14/723,809, Response filed Jan. 5, 2016 to Non Final Office Action dated Oct. 7, 2015", 8 pgs.
"U.S. Appl. No. 14/723,809, Response filed Jun. 13, 2016 to Non Final Office Action dated Mar. 11, 2016", 7 pgs.
"U.S. Appl. No. 14/723,809, Response filed Nov. 23, 2016 to Non Final Office Action dated Jul. 28, 2016", 7 pgs.
"Australian Application Serial No. 2013287185, First Examiner Report dated May 8, 2015", 2 pgs.
"Australian Application Serial No. 2013287185, Response filed Aug. 14, 2015 to First Examiner Report dated May 8, 2015", 19 pgs.
"Australian Application Serial No. 2015249093, First Examiners Report dated Mar. 8, 2016", 2 pgs.
"Belgian Application Serial No. 2013/0463, Office Action dated Oct. 17, 2013", 13 pgs.
"Belgium Application Serial No. 2014/0126, Office Action dated Jan. 12, 2016", Without English Translation, 11 pgs.
"Belgium Application Serial No. 2014/0126, Response filed May 11, 2016 to Office Action dated Jan. 12, 2016", not in English, 6 pgs.
"Canadian Application Serial No. 2,874,463, Office Action dated Feb. 10, 2016", 3 pgs.
"Canadian Application Serial No. 2,874,463, Response file Aug. 9, 2016 to Office Action dated Feb. 10, 2016", 7 pgs.
"Chinese Application Serial No. 201310274598.9, Office Action dated Mar. 28, 2016", 9 pgs.
"Chinese Application Serial No. 201310274598.9, Office Action dated Nov. 24, 2016", w/ English Translation, 15 pgs.
"Chinese Application Serial No. 201310274598.9, Response filed Aug. 12, 2016 to Office Action dated Mar. 28, 2016", (With English Translation), 10 pgs.
"Chinese Application Serial No. 201310274598.9, Response filed Feb. 9, 2017 to Office Action dated Nov. 24, 2016", w/ English Claims, 7 pgs.
"Chinese Application Serial No. 201310274598.9, Voluntary Amendmetn dated May 13, 2014", 3 pgs.
"Correction on HARQ-ACK translation for a UE configured with PUCCH format 3", 3 GPP TSG-WG1 Meeting #73. R1-132684., (May 20, 2013), 9 pgs.
"DAI Design for TDD configuration #5 (9:1) in ACK/NACK Bundling", Nokia—3GPP TSG RAN WG1-R1-082615 (revised from R1-82601), (Jul. 2008), 7 pgs.
"Discussion on PUCCH HARQ-ACK transmission", Samsung, R1-122220, (May 12, 2012).
"Discussion on PUCCH HARQ-ACK transmission", 3gpp Draft:R1-122220, 3rd Generation Partnership Project (3GPP), Mobile Competence Centre ; 650, Route Des Lucioles, (May 12, 2012).
"European Applicant Serial No. 13813633.8, Communication Pursuant to Article 94(3) EPC dated Jan. 17, 2017", 7 pgs.
"Korean Application Serial No. 10-2014-7033839, Response filed Jul. 22, 2016 to Office Action dated May 23, 2016", with English translation of claims, 19 pgs.
"Korean Application Serial No. 10-2017-7002495, Office Action dated Mar. 8, 2017", w/ English Translation, 5 pgs.
"Korean Application Serial No. 10-2017-7002495, Response filed May 8, 2017 to Office Action mailed Mar. 8, 2017"w/ English Claims, 21 pgs.
"Mexican Application Serial No. MX/a/2014/014725, Office Action dated Jun. 29, 2016", 2 pgs.
"Mexican Application Serial No. MX/a/2014/014725, Response filed Sep. 13, 2016 to Office Action dated Jun. 29, 2016", 8 pgs.
"Netherlands Application Serial No. 2011073, Office Action dated Nov. 12, 2013", w/English translation, 11 pgs.
"Netherlands Application Serial No. 2012390, Search Report dated Jul. 15, 2014", 2 pgs.
"Netherlands Application Serial No. 2012390, Written Opinion dated Jul. 15, 2014", 6 pgs.
"Russian Application Serial No. 2014148570, Office Action dated Jun. 1, 2015", w/ English Translation, 5 pgs.
"Russian Federation Application Serial No. 2014148570, Office Action dated Oct. 26, 2015", w/ English Translation, 6 pgs.
"Russian Federation Application Serial No. 2014148570, Response filed Jan. 25, 2016 to Office Action dated Oct. 26, 2015", (English Translation of Claims), 9 pgs.
"Spanish Application Serial No. P201330989, Office Action dated Jul. 29, 2015", in English, 4 pgs.
"Spanish Application Serial No. P201330989, Office Action dated Dec. 19, 2014", 10 pgs.
"Spanish Application Serial No. P201330989, Response filed Mar. 24, 2015 to Office Action dated Dec. 19, 2014", 16 pgs.
"Spanish Application Serial No. P201330989, Response filed Aug. 5, 2015 to Office Action dated Jul. 29, 2015", 12 pgs.
"Sweden Application Serial No. 1350813-0, Office Action dated Jun. 30, 2017", w/o English Translation, 4 pgs.
"Sweden Application Serial No. 1350813-0, Office Action dated Dec. 19, 2014", 6 pgs.
"Sweden Application Serial No. 1350813-0, Response filed Apr. 20, 2015 to Office Action dated Dec. 19, 2014", not in English, 11 pgs.
"Taiwanese Application Serial No. 102123279, Office Action dated Jan. 19, 2015", 3 pgs.
"Taiwanese Application Serial No. 102123279, Response filed Apr. 17, 2015 to Office Action dated Jan. 19, 2015", w/ English Claims, 28 pgs.
"Taiwanese Application Serial No. 104135843, Office Action dated Dec. 14, 2016", w/ English claims, 13 pgs.
"Taiwanese Application Serial No. 104135843, Response filed Mar. 7, 2017 to Office Action dated Dec. 14, 2016", w/ English Translation, 39 pgs.
Asustek, "DRX retansmission missing for TDD", 3GPP Draft; R2-100266 DRX Retransmission Missing for Tdd, 3rd Generation Partnership Project (3GPP), Mobile Competence Centre ; 650, Route Des Lucioles ; F-06921 Sophia-Antipolis Cedex ; France, vol. Ran Wg2, No. Valencia, Spain, (Jan. 12, 2010), 4 pgs.
CATT, "Corrections of the notation of k and k_m", 3GPP Draft, R1-112936, 3rd Generation Partnership Project (3GPP), Mobile Competence Centre; 650, Route Des Lucioles; F-06921 Sophia-Antipolis Cedex; France; vol. Ran Wg1, (Oct. 4, 2011).
CATT, "Corrections of the notation of k and k_m", 3gpp Draft; R1-112936, 3rd Generation Partnership Project (3GPP), Mobile Competence Centre; 650, Route Des Lucioles; F-06921 Sophia-Antipolis Cedex; France; vol. Ran Wg1, (Oct. 4, 2011), 15 pgs.
CATT, "Remaining issue on PUUCH power control in LTE-A", 3gpp Draft, R1-111361,3rd Generation Partnership Project (3GPP), Mobile Competence Centre ; 650, Route Des Lucioles; F-06921 Sophiaantipolis Cedex ; France; vol. Ran Wg1, (2011).
Catt, "Way forward on HARQ-ACK transmission for TDD inter-band CA", 3gpp Draft, R1-112966, 3rd Generation Partnership Project (3GPP), Mobile Competence Centre; 650, Route Des Lucioles; F-06921 Sophia-Antipolis Cedex, (May 25, 2012).
Ericsson, et al., "PUCCH resource mapping", 3gpp Draft; R1-121988, 3rd Generation Partnership Project (3GPP), Mobile Competence Centre ; 650, Route Des Lucioles ; F-06921 Sophia-Antipolis Cedex, (May 12, 2012).
"France Application Serial No. 1356403, Response filed Jan. 9, 2018 to Office Action dated Nov. 10, 2017", w/English Claims, 10 pgs.
"France Applicatoin Serial No. 1356403, Office Action dated Nov. 10, 2017", w/ English Translation, 4 pgs.
"Japanese Application Serial No. 2016-228325, Response filed Nov. 13, 2017 to Office Action dated Aug. 15, 2017", w/ English Claims, 16 pgs.
"Sweden Application Serial No. 1350813-0, Response filed Oct. 25, 2017 to Office Action dated Jun. 30, 2017", without English Translation, (8 pgs).
"European Application Serial No. 13813633.8, Extended European Search Report dated Feb. 16, 2016", 10 pgs.
"European Application Serial No. 13813633.8, Response filed Jul. 17, 2017 to Communication Pursuant to Article 94(3) EPC dated Jan. 17, 2017", w/ English Translation, 10 pgs.

(56) References Cited

OTHER PUBLICATIONS

"European Application Serial No. 16191779.4, Exteneded European Search Report dated Jan. 17, 2017", 11 pgs.
"European Application Serial No. 16191779.4, Response filed Aug. 16, 2017 to Extended European Search Report dated Jan. 17, 2017", 15 pgs.
"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Explicit DTX support for UL ACK/NAK Feedback in LTE-A TDD", Nokia_3GPP TSG RAN WG1_R1-104430, (Aug. 2010), 5 pgs.
"Finland Application Serial No. 20135724, Office Action dated Apr. 22, 2016", in English, 6 pgs.
"Finland Application Serial No. 20135724, Response filed Aug. 5, 2016 to Office Action dated Apr. 22, 2016", 8 pgs.
"France Application Serial No. 1356403, Office Action dated Sep. 23, 2016", 36 pgs.
"France Application Serial No. 1356403, Response filed Dec. 23, 2016 to Office Action dated Sep. 23, 2016", not in English, 10 pgs.
"HARQ-ACK Bundling for PUCCH Format 3", Samsung, R1-112499, (Aug. 26, 2011).
"HARQ-ACK Multiplexing in PUSCH for "Mode a" and "Mode b" in TDD", Samsung, R1-111454, (May 3, 2011).
"International Application Serial No. PCT/US2013/045599, International Preliminary Report on Patentability dated Jan. 15, 2015", 6 pgs.
"International Application Serial No. PCT/US2013/045599, International Search Report dated Oct. 15, 2013", 3 pgs.
"International Application Serial No. PCT/US2013/045599, Written Opinion dated Oct. 15, 2013", 4 pgs.
"Japanese Application Serial No. 2015-515289, Notice of Reasons for Rejection dated Dec. 15, 2015", With English translation, 6 pgs.
"Japanese Applicatin Serial No. 2015-515289, Office Action dated Jun. 21, 2016", (English Translation), 5 pgs.
"Japanese Application Serial No. 2015-515289, Response filed Mar. 11, 2016 to Notice of Reasons for Rejection dated Dec. 15, 2015", with English translation of claims, 10 pgs.
"Japanese Application Serial No. 2015-515289, Reponse filed Sep. 21, 2016 to Office Action mailed Jun. 21, 2016", W/ English Translation of Claims, 10 pgs.
"Japanese Application Serial No. 2016-228325, Office Action dated Aug. 15, 2017", W/English Translation, 4 pgs.
"Korean Application Serial No. 10-2014-7033839, Office Action dated May 23, 2016", 9 pgs.
"Malaysian Application Serial No. PI2014703591, Office Action dated Feb. 28, 2018", 3 pgs.

* cited by examiner

| Primary Cell | Secondary Cell | Resource | Constellation | RM Code Input Bits |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | $b(0), b(1)$ | $o(0), o(1), o(2), o(3)$ |
| ACK, ACK, ACK | ACK, ACK, ACK | $n_{PUCCH,1}^{(1)}$ | 1, 1 | 1,1,1,1 |
| ACK, ACK, NACK/DTX | ACK, ACK, ACK | $n_{PUCCH,1}^{(1)}$ | 0, 0 | 1,0,1,1 |
| ACK, NACK/DTX, any | ACK, ACK, ACK | $n_{PUCCH,3}^{(1)}$ | 1, 1 | 0,1,1,1 |
| NACK/DTX, any, any | ACK, ACK, ACK | $n_{PUCCH,3}^{(1)}$ | 0, 1 | 0,0,1,1 |
| ACK, ACK, ACK | ACK, ACK, NACK/DTX | $n_{PUCCH,0}^{(1)}$ | 1, 0 | 1,1,1,0 |
| ACK, ACK, NACK/DTX | ACK, ACK, NACK/DTX | $n_{PUCCH,3}^{(1)}$ | 1, 0 | 1,0,1,0 |
| ACK, NACK/DTX, any | ACK, ACK, NACK/DTX | $n_{PUCCH,0}^{(1)}$ | 0, 1 | 0,1,1,0 |
| NACK/DTX, any, any | ACK, ACK, NACK/DTX | $n_{PUCCH,3}^{(1)}$ | 0, 0 | 0,0,1,0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

*FIG. 1*

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | $b(0),b(1)$ | $o(0),o(1),o(2),o(3)$ |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |

*FIG. 2*

| | | | | |
|---|---|---|---|---|
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

*FIG. 2A*

HARQ-ACK HANDLING FOR UNINTENDED DOWNLINK SUB-FRAMES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This *is an* application *for reissue of U.S. Pat. No. 10,027,446, issued Jul. 17, 2018 on U.S. patent application Ser. No. 15/614,192, filed Jun. 5, 2017, titled "HARQ-ACK Handling For Unintended Downlink Sub-Frames", which* is a continuation of U.S. patent application Ser. No. 14/723,809, filed May 28, 2015, *now issued as U.S. Pat. No. 9,673,939,* which is a continuation of U.S. patent application Ser. No. 14/605,311, filed on Jan. 26, 2015, now issued as U.S. Pat. No. 9,106,420, which is a continuation of U.S. patent application Ser. No. 13/721,458, filed Dec. 20, 2012, now issued as U.S. Pat. No. 8,958,331, which claims priority under 35 USC 119 to U.S. Provisional Patent Application Ser. No. 61/667,325, filed Jul. 2, 2012, which is hereby incorporated herein by reference in its entirety.

BACKGROUND

Long Term Evolution (LTE) and other wireless networks rely on transmission of messages across an unreliable medium between a mobile device (e.g., a User Equipment (UE)) and the Radio Access Network (RAN). In LTE the RAN consists of one or more eNodeBs. This unreliable communication medium can create problems for proper communication of data between the RAN and the UE as data may be lost or corrupted due to low signal quality, interference, or other problems with the wireless medium.

BRIEF DESCRIPTION OF THE DRAWINGS

FIG. 1 is a table showing mappings from HARQ-ACK responses to resources, constellations and RM Code Input Bits for two cells with a bundling window of 3 according to some examples of the present disclosure.

FIG. 2 is a table showing mappings from HARQ-ACK responses to resources, constellations and RM Code Input Bits for two cells with a bundling window of 4 according to some examples of the present disclosure.

FIG. 2A is a continuation of the table of FIG. 2 according to some examples of the present disclosure.

DETAILED DESCRIPTION

Figure 3:
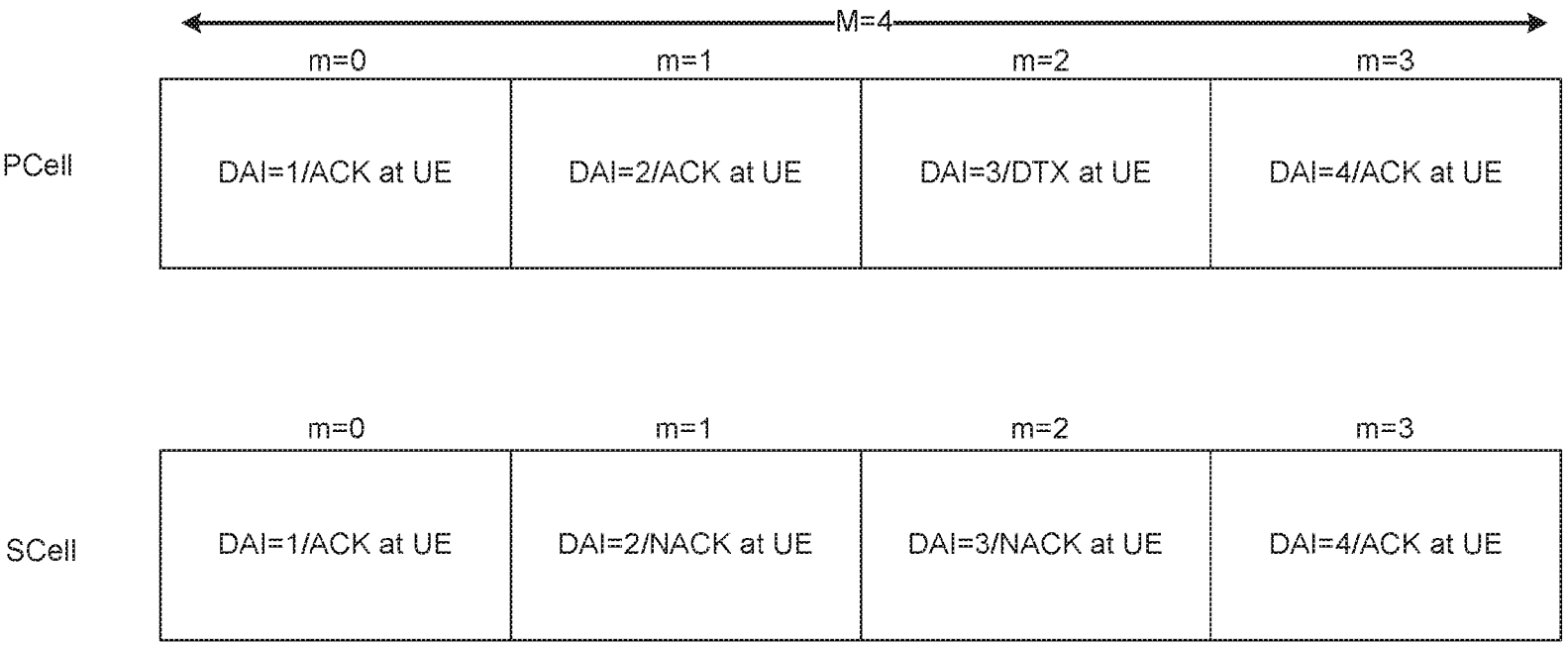
FIG. 3 shows a diagram of an example resource allocation according to some examples of the present disclosure.

In order to deal with the unreliable wireless communication medium, LTE and other cellular networks employ a mechanism called. Hybrid Automatic Repeat Request (HARQ) to provide error correction and packet acknowledgements to ensure the safe delivery of data between the RAN and the UE. HARQ provides for error correction at the receiver side using forward error correction coding (FEC) as well as automatic feedback mechanisms (Automatic Repeat Request (ARQ)) to indicate to the sender whether or not the packets were successfully received. Upon receipt of a packet of data, the receiver uses an error detection code (e.g., a Cyclic Redundancy Check (CRC)) to determine if the packet was correctly received. If the packet was received successfully, the receiver acknowledges the sender using a feedback mechanism (e.g., ACK). If the packet was not received successfully, the receiver may attempt to repair the packet using the FEC information. If the receiver is successful in using the FEC information to repair the packet, it may ACK the sender, otherwise the receiver may respond to the sender with a Negative Acknowledgement (NACK). In yet other examples, the receiver (the UE) may respond that it was in Discontinuous Transmission Mode (DTX) mode. The DTX response may represent a case in which the LIE is not able to properly detect information on a control channel (e.g., the Primary Downlink Control Channel-PDCCH) and thus was unable to determine if a packet was sent to the UE.

In a cellular network, these HARQ responses typically are transmitted on the control channels. Responses for downlink traffic sent from the RAN to the UE are typically sent in uplink control channels (e.g., the Physical Uplink Control Channel (PUCCH)). Responses for uplink traffic sent from the UE to the RAN are typically sent in downlink HARQ-ACK channels (e.g., the Physical hybrid HARQ indicator channel: PHICH). Packets that are not acknowledged (either NACKed or simply not acknowledged at all) may be retransmitted by the sender.

In some systems, uplink communications (from the UE to the RAN) are separated from downlink communications in the frequency domain. That is, the uplink and downlink wireless communications occur on different frequency bands. These systems are referred to as Frequency Duplex Division (FDD) systems. In other examples, the uplink and downlink wireless communications may share the same frequency bands, but may be divided in the time domain. That is, the frequency bands are reserved for the uplink wireless transmissions in some time instances (e.g. called time slots), and the downlink wireless communications in other time instances (e.g. time slots). This scheme is called Time Division Duplex (TDD). In still other examples, half-duplex FDD (H-FDD) systems feature the uplink and downlink wireless communications on different frequency bands but divided as well in the time domain.

The very nature of the cellular network is that communications between the UE and the RAN is asymmetrical in favor of the downlink wireless link. That is, more data is usually sent from the RAN to the UE, than from the UE to the RAN. In order to compensate for this, cell planners will often allocate more frequency or time resources (depending on whether the network is FDD or TDD) to the downlink wireless communications than are allocated to the uplink wireless communications.

This resource asymmetry creates problems for the UE in trying to manage the necessary HARQ acknowledgements because there are often insufficient uplink resources on the uplink control channels to transmit these responses. This problem is only exasperated with the addition of multiple carriers and other uplink signaling such as Channel State Information.

In LTE, wireless transmissions are typically broken into discrete units called frames, which may then be broken down into sub-frames and the sub-frames into one or more code words. Each code word may have a mapping relationship with a particular transport block and herein are used interchangeably unless specified otherwise. With FDD systems, the HARQ response may be transmitted at a fixed number of sub-frames after the transmission is received (typically 4 sub-frames later). However, with TDD systems, a fixed delay is not possible as there often are a variable number of uplink and downlink timeslots in a radio frame due to the asymmetric wireless imbalance.

To solve these problems, for TDD systems, the 3rd Generation Partnership Project (3GPP) which promulgates the standards for 4G (LTE) wireless networks has developed several mechanisms. The first is ACK/NACK/DTX time domain bundling. For HARQ-ACK bundling, the ACK, NACK, or DTX result for each particular code word in each downlink sub frame for a particular number of sub frames (called a bundling window) received on the downlink channel (e.g., a Physical Downlink Shared Channel—PDSCH) are logically AND'ed to produce one or multiple composite result corresponding to each code word in all the sub frames of a bundling window. The number of composite ACK/NACK/DTX results produced then equals the number of code words in a sub-frame. For example, if the size of bundling window is four downlink sub-frames, and each sub-frame has two code words, the acknowledgements of the first code word of sub-frames 0-3 are logically AND'ed together, and the second code words of sub-frames 0-3 are also AND'ed together to produce two acknowledgement bits. The benefit of this technique is that it is very compact, using few bits so that the uplink coverage can be assured. The downside is that if any one of the code words of any one of the sub-frames is not received correctly, then the particular code word for all sub-frames will be retransmitted. Another technique is to use HARQ-ACK multiplexing which may logically AND code words across the code words (i.e. called spatial domain bundling) for each downlink sub-frame individually to produce one acknowledgement bit per each down link sub frame. The result is an ACK/NACK/DTX result for each associated downlink sub frame within a bundling window. For four down link sub-frames, with two code words per sub frame, a spatial domain bundling across two code words (if any) by logical AND operation is applied in the sub-frame and the multiple bundled ACK/NACKs in the sub-frames may result in one composite state within a bundling window. For a HARQ-ACK response sent on the Physical Uplink Control Channels (PUCCH), the composite state may be represented as a combination of a PUCCH resource and constellation points. This results in four acknowledgement results—one for each sub-frame. Notice that despite the fact that the name for this particular HARQ-ACK technique is "multiplexing," throughout the specification the term "bundling window" is used.

A bundling window is a time unit (e.g., a number of sub-frames) specifying when HARQ-ACK feedback corresponding to down link traffic at a particular uplink sub frame is transmitted in the uplink. A UE transmits HARQ-ACK feedback using the PUCCH in a sub-frame n where the HARQ-ACK feedback for $n-k_i$, where $k_i$, $\in K$ (defined in Table 1) and $0 \leq i \leq M-1$. The bundling window is generally defined as the down link sub-frames of $n-k_i$ for an uplink HARQ-ACK feedback at sub-frame n.

TABLE 1

| Downlink association set index K: $\{k_0, k_1, \ldots k_{M-1}\}$ for TDD | | | | | | | | | | |
|---|---|---|---|---|---|---|---|---|---|---|
| UL-DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TDD UL-DL configuration table is given as Table 2.

TABLE 2

| TDD UL-DL configuration | | | | | | | | | | | |
|---|---|---|---|---|---|---|---|---|---|---|---|
| TDD UL/DL Configuration | Downlink to Uplink Switch Point Periodicity | Sub-frame number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TDD Uplink/Downlink Configurations (D = downlink, S = special sub-frame with the three fields DwPTS, GP and UpPTS which is used to give the UE time to switch from downlink to uplink, U = uplink).

LTE Advanced supports carrier aggregation in which multiple carriers may be utilized in the downlink This means that multiple ACK/NACK information bits for multiple carriers need to be fed back in the uplink. For this, LTE defines a technique known as channel selection with time domain bundling.

This technique utilizes a similar technique as the HARQ-ACK multiplexing except that time domain bundling of this technique is slightly different from the existing one. The time domain bundling for carrier aggregation may be for transmitting the number of consecutive ACKs for each component carrier while that for single carrier is for transmitting the logically bundled HARQ-ACK information. The resultant ACK/NACK information may be encoded by the joint selection of a channel and a QPSK constellation symbol. Essentially, the multiplexed acknowledgement results may then be indexed into a lookup table to select a two bit field (the QPSK constellation) and a PUCCH resource (the selected channel) for PUCCH transmission. A RM code input bit set is also provided in case the HARQ-ACK is piggybacked on PUCCH. The mapping tables are shown in FIGS. 1, and 2 (FIG. 2 is continued on FIG. 2A) for different bundling window sizes. The column labeled HARQ-ACK(0)-(2) for FIGS. 1 and HARQ-ACK(0)-(3) for FIG. 2 and FIG. 2A represent the ACK, NACK, or DTX decision for that particular sub-frame for both the primary and secondary cells (PCell and SCell respectively). For example, in the case of a four sub frame bundling window, if sub-frame(0) was received successfully (ACK), sub-frame (1) was received unsuccessfully (NACK), sub-frame (2) was received successfully (ACK), and sub-frame (3) was received successfully (ACK) on the primary cell and a response of ACK, ACK, ACK, NACK, on the secondary cell, the UE would select a constellation of (0,1) with a feedback resource corresponding to a Physical Uplink Control Channel (PUCCH) 3 and using code input bits of 0,0,1,1. In short, the HARQ-ACK(j) column is the ACK/NACK/ or DTX response for each particular downlink sub frame for each of the primary and secondary cells (for multiple carriers) and the corresponding PUCCH resources, constellations, and RM code input bits to use depending on the HARQ-ACK(j) selected for each of the primary and secondary cells. This technique utilizes PUCCH format 1b when HARQ-ACK is transmitted using PUCCH.

HARQ-ACK bundling or HARQ-ACK multiplexing may not work properly if the UE does not correctly receive the scheduling information for any scheduled frames. For example, if the eNodeB schedules the terminal for two sub-frames with a bundling window size 2, but the UE only received the last frame, but was unaware that it was scheduled in the first frame, the UE would reply with an ACK. The eNodeB would interpret this ACK as an acknowledgement of both sub-frames. In order to determine when a downlink grant for a UE is missed, the LTE specification provides a Downlink Assignment Index (DAI) sent to the UE from the RAN along with the downlink scheduling information on the PDCCH. The DAT conveyed in downlink grant demotes the accumulative number of PDCCH(s) with assigned PDSCH transmission(s) and PDCCH indicating Semi Persistent Scheduling (SPS) release up to the present sub-frame within the same bundling window of each configured serving cell. The UE then utilizes the DAI to generate the HARQ-ACK(j) within the bundling window.

Turning now to FIG. 3, an example response calculation is shown. In the example of FIG. 3, a bundling window of four sub-frames (M=4) is shown in two configured cells. The HARQ-ACK(j) response for the primary cell (PCell) is ACK, ACK, DTX, ACK and in the secondary cell (SCell) it is ACK, NACK, NACK, ACK, respectively. The DAIs received on the PDCCH for the PCell are 1 for sub-frame 0, 2 for sub-frame 1, and 4 for sub-frame 3. Note that the UE was not able to decode the PDCCH on sub-frame 2 (m=2) and thus did not update its DAI value. Even though the UE lost the updated DAI value it recovers it in sub-frame m=3 and thus knows that the DAI is 4 at the end of the bundling window. Because the DAI value is 4, the UE knows that it needs four HARQ-ACK(j) responses. For the SCell, the DAI's received on the PDCCH are 1, 2, 3, and 4 for sub-frames 0, 1, 2, and 3 respectively.

Based on the mapping table in FIGS. 2 and 2A this produces a response of:

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | PUCCH RESOURCE | b(0), b(1) | o(0), o(1), o(2), o(3) |
| ACK, ACK, NACK/ DTX, any | (ACK, NACK/ DTX, any, any), except for (ACK, DTX, DTX, DTX) | 1 | 0, 1 | 1, 0, 0, 0 |

Figure 4:
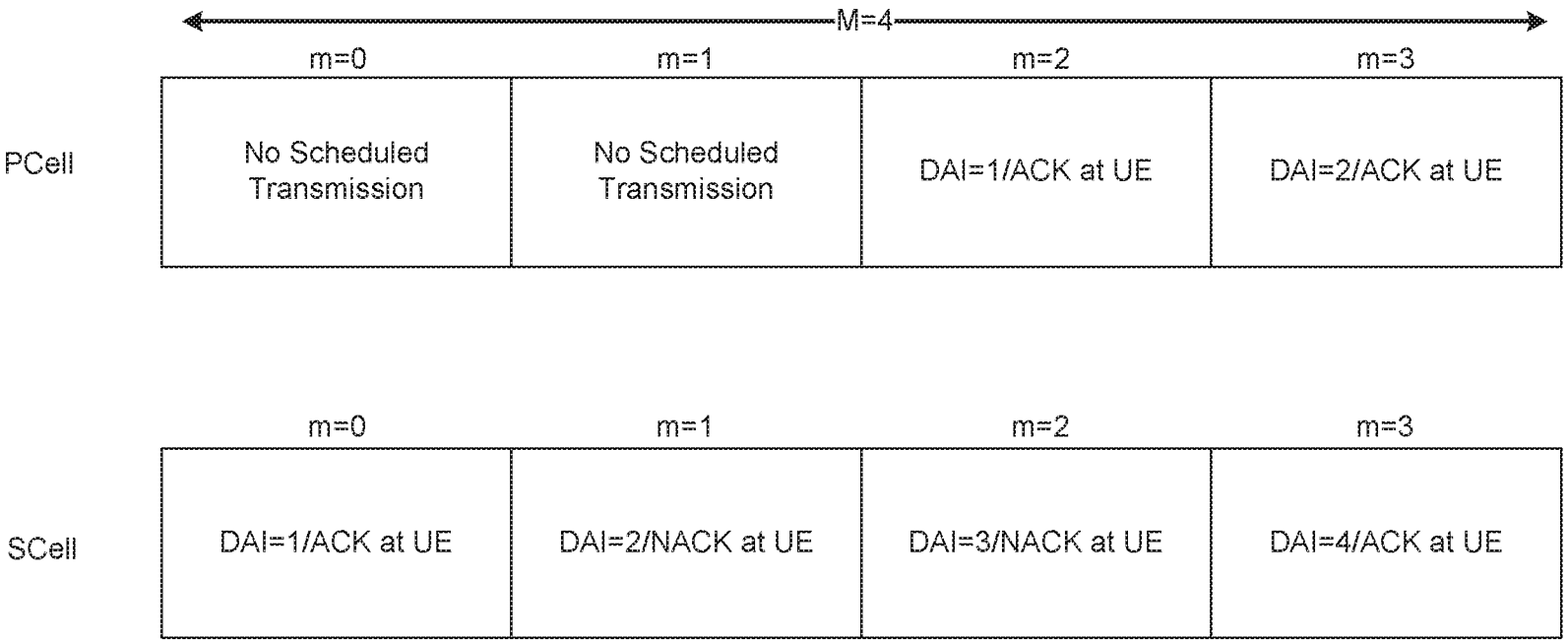
FIG. 4 shows a diagram of an example resource allocation according to some examples of the present disclosure.

Note that there is a problem when all sub-frames of a particular bundling window are not scheduled by the RAN. Since certain frames are not scheduled, the DAI will not be incremented and will be less than the bundling window size at the end of the bundling window. The feedback tables of FIG. 1 and FIG. 2 assume that all frames are scheduled. FIG. 4 shows one example of this issue. In this example the first two downlink sub-frames in the PCell are not scheduled. Thus for sub-frame 2, DAI is 1 and for sub-frame 3, DAI is 2 (compared to FIG. 3, where DAI was 3 and 4 for sub frames 2 and 3 respectively). Since the HARQ-ACK (j) is determined in conjunction with the DAI value, HARQ-ACK (0) corresponds to sub-frame 2 and HARQ-ACK(1) corresponds to sub-frame 3. However, HARQ-ACK(2) and HARQ-ACK(3) are undefined because there are no corresponding DAI values of 3 and 4 within the bundling window according to the definition of DAI This is because the DAI value is defined as the accumulative number of PDCCH(s) within an assigned PDSCH transmission(s) and PDCCH indicating downlink Semi-Persistent Scheduling (SPS) release up to the present sub-frame within a bundling window. Therefore, if there is no expected UE, sub-frame to be monitored by a UE for HARQ-ACK(j) related to DAI value within a bundling window, a UE behavior is not specified.

Disclosed in some examples are systems, methods, UEs, and machine-readable media which solve the issue of generating an acknowledgement for the situation in which a last received DAI (LDAI) value is less than a size of a bundling window. In some examples, a predetermined state is utilized for HARQ-ACK(j) for the case LDAI<=j<M−1, where M is the multiplexing or bundling window size. For example, the DTX state may be padded into these HARQ-ACK responses. So for example, in FIG. 4, the HARQ-ACK(j) for the PCell to use to determine the proper response parameters would be: ACK, ACK, DTX, DTX.

Since the last two states for the PCell are padded by DTX, the UE will know the exact mapping from the table to use. In addition, on the network side, since the eNodeB already knows the last two states are padded with DTX, the irrelevant states other than DTX can he excluded during PUCCH detection hypothesis tests which may improve HARQ-ACK detection performances. For example in FIG. 3, since the HARQ-ACK response in PCell is {ACK, ACK, DTX, DTX}, {ACK, NACK, DTX, DTX}, {NACK, ACK, DTX, DTX}, or {NACK, NACK, DTX, DTX}, the states of {any, any, ACK/NACK, ACK/NACK} can be excluded in eNB detection. By decreasing the detection hypothesis tests, the PUCCH detection performance may be enhanced.

Applying this method to the example shown in FIG. 4 produces:

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | PUCCH RESOURCE | b(0), b(1) | o(0), o(1), o(2), o(3) |
| ACK, ACK, NACK/DTX, any | (ACK, NACK/DTX, any, any), except for (ACK, DTX, DTX, DTX) | 1 | 0, 1 | 1, 0, 0, 0 |

While in some examples the HARQ-ACK(j) may be filled with DTX for the case in which all downlink sub-frames within a bundling window were not scheduled, in other examples, other values may be used, such as an ACK, NACK, or another defined value. This is because the eNodeB has enough system knowledge to ignore these values. In fact, in some examples, the UE may arbitrarily choose any ACK/NACK/DTX value.

Turning now to FIG, 5A, a method 5000 of acknowledging a transmission when not all the downlink frames in a particular bundling window have been scheduled is shown. At operation 5010, the UE receives scheduling information on the PDCCH indicating downlink frames which are scheduled. At operation 5020, the UE determines that it has received the last downlink assignment for a particular bundling window and at operation 5030 determines that the last DAI value (LDAI) is less than the bundling window size. At operation 5040 the UE determines the ACK/NACK/DTX responses for the frames for which the UE was aware it was scheduled. At operation 5050, the remaining HARQ-ACK(j) that do not have corresponding DAI values are filled in with a predetermined value (e.g., DTX).

Figure 5A:
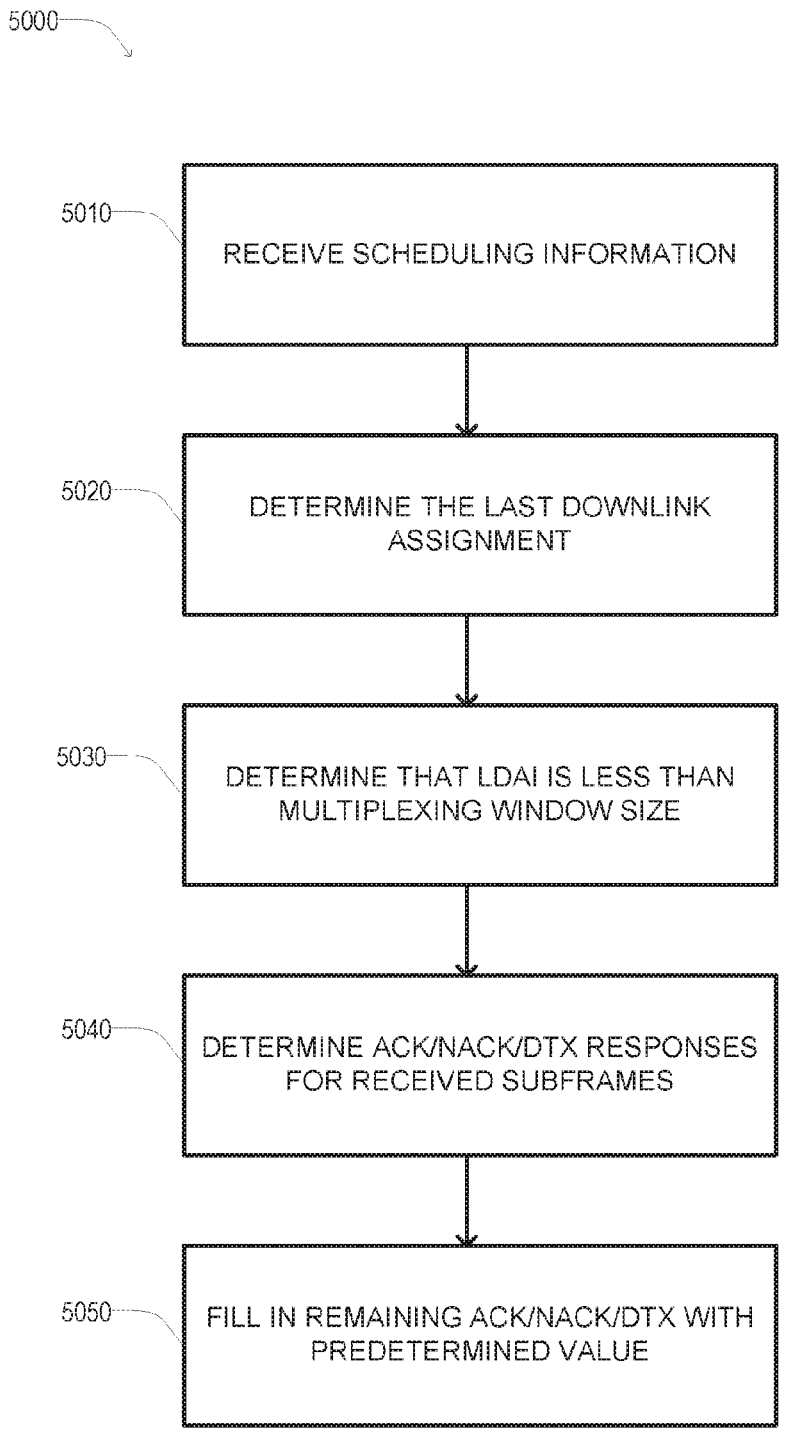
FIG. 5A shows a flowchart of a method of generating a HARQ-ACK response according to some examples of the present disclosure.
Figure 5B:
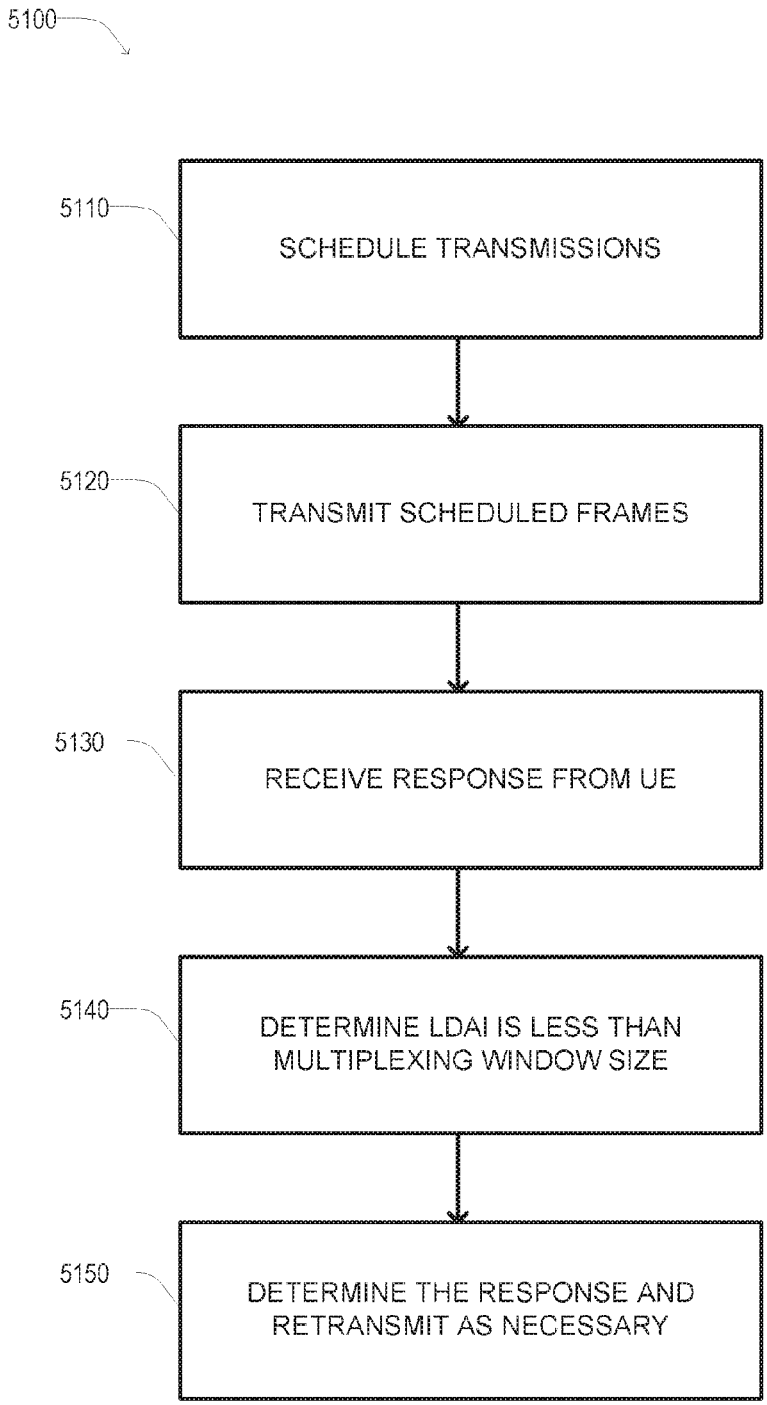
FIG. 5B shows a flowchart of a method of processing a HARQ-ACK response according to some examples of the present disclosure.

Turning now to FIG. 5B, a method 5100 of processing an acknowledgement at an eNodeB of a transmission in which not all the downlink frames in a particular bundling window have been scheduled is shown. At operation 5110 the base station (e.g., an eNodeB) may schedule one or more downlink transmissions for a particular acknowledgement period (e.g., a bundling window) and notify the UE through a downlink control channel such as a Physical Downlink Control Channel (PDCCH). At operation 5120, the eNodeB may transmit the scheduled frames. At operation 5130 the eNodeB may receive the response from the UE. At operation 5140, the eNodeB may determine that the last DAI value sent on the PDCCH is less than a bundling window size. At operation 5150, the eNodeB may use the resource (e.g., the PUCCH resource) that the response was received on along with the received constellation and RM code bits to determine the response, factoring in that the HARQ-ACK(j) where j is LDAI<=j<M−1, where M is the multiplexing or bundling window size, are padded values. The eNodeB may then transmit any necessary retransmissions.

Figure 6:
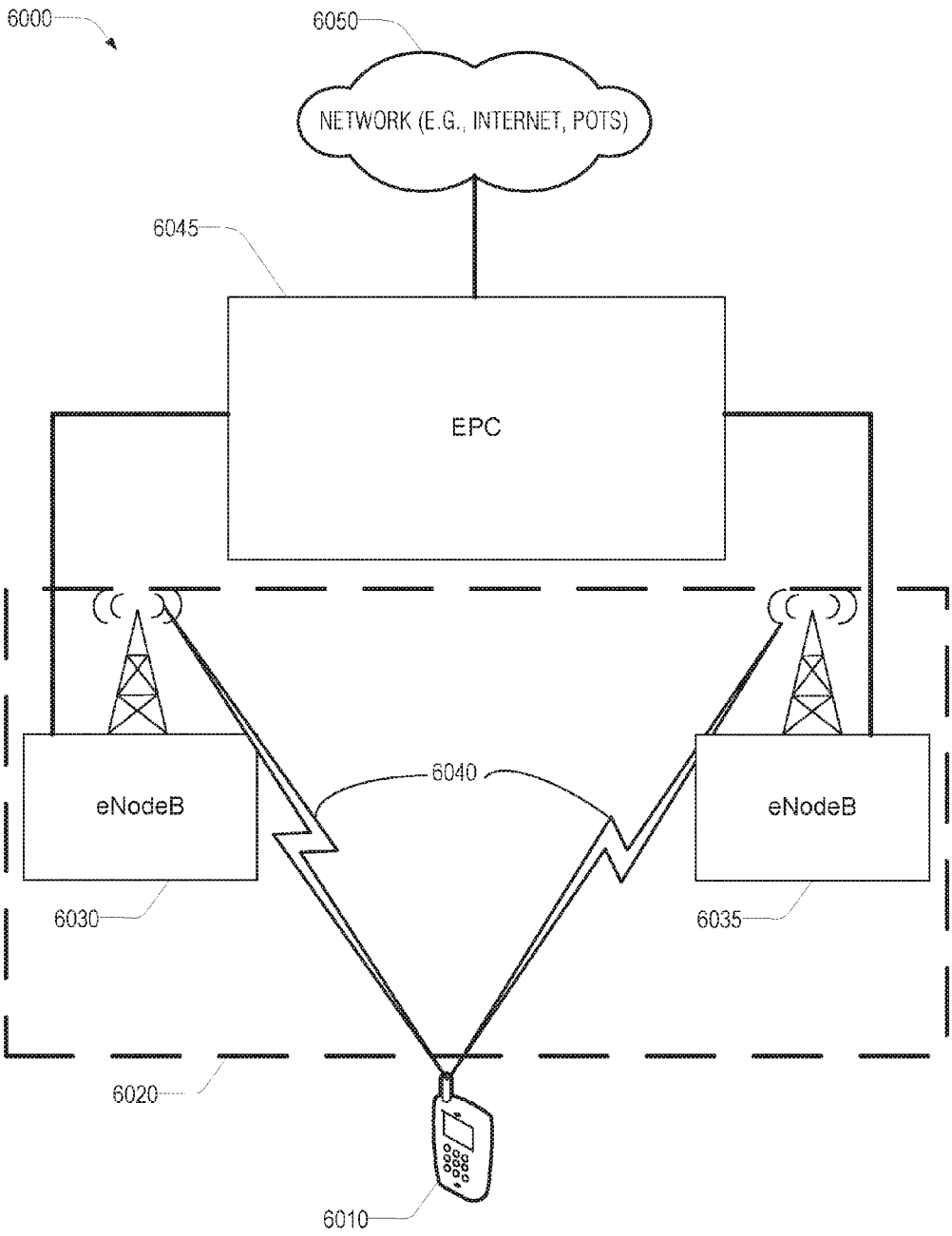
FIG. 6 shows a block diagram of a wireless communication system according to some examples of the present disclosure.

Turning now to FIG. 6 a system 6000 for acknowledging transmissions is shown. User Equipment (UE) 6010 communicates with a Radio Access Network (RAN) 6020 which may include one or more base stations (e.g., an eNodeB) 6030, 6035 over one or more radio links 6040. RAN 6020 may be connected to a core network 6045, such as an enhanced Packet Core. EPC 6045 may be connected to a network 6050, such as the internet, a Plain Old Telephone Service network (POTS), or the like. In the system of FIG. 6, the radio links 6040 may operate in a Time Division Duplex mode (TDD) mode.

Figure 7:
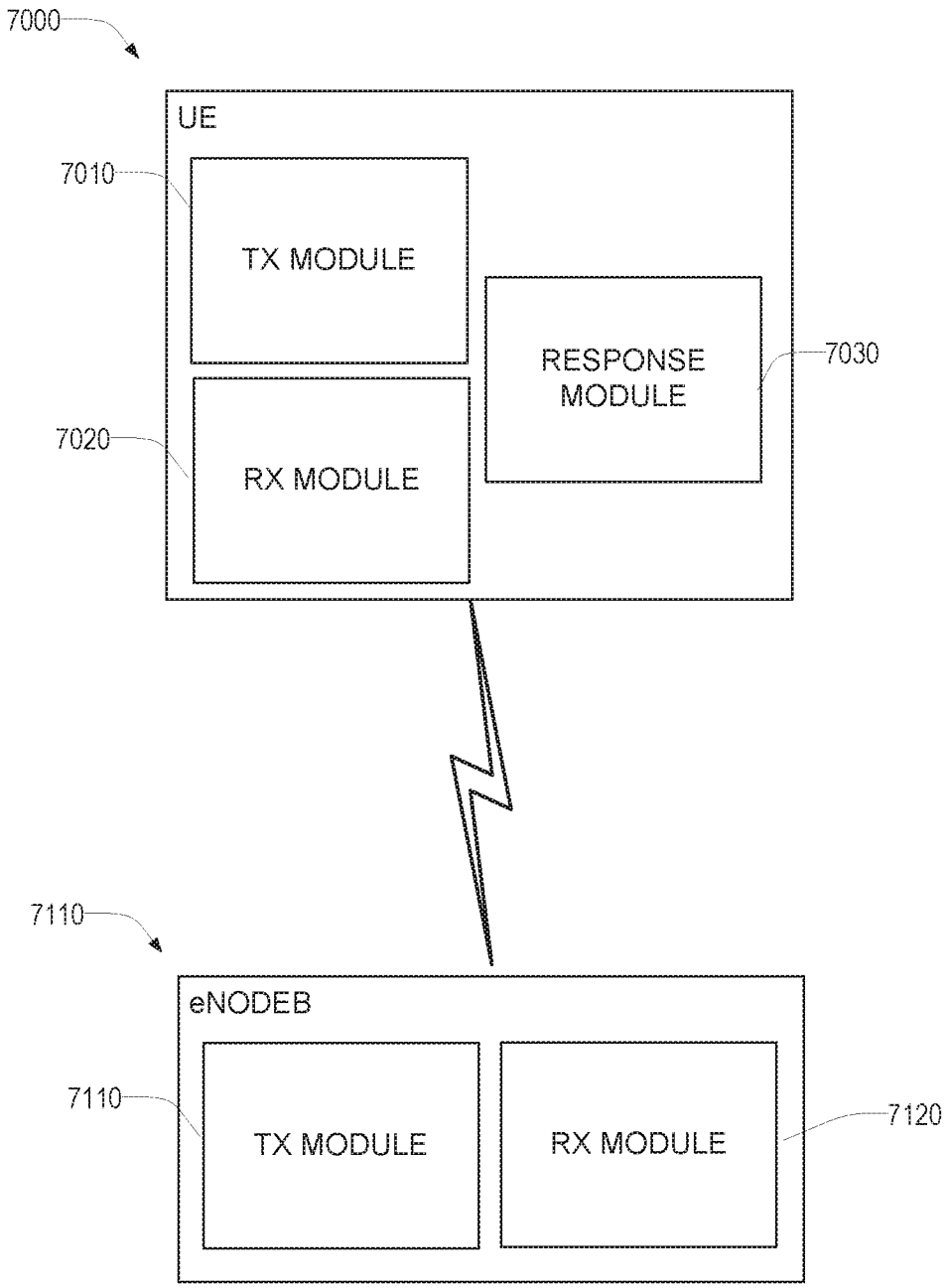
FIG. 7 shows a block functional diagram showing certain functions of a LIE and an eNodeB according to some examples of the present disclosure.

FIG. 7 shows a partial functional diagram of a UE 7000 (more components not shown may be included). UE 7000 may include a transmission module 7010. The transmission module 7010 may transmit control and user traffic to the RAN over one or more uplink channels such as a Physical Uplink Control Channel (PUCCH), a Physical Uplink Shared Channel (PUSCH) or the like. Transmission module 7010 may transmit the acknowledgements of user traffic and control traffic sent from the RAN to the UE 7000 on the downlink channels (e.g., the Physical Downlink Shared Channel (PDSCH)—and the Physical Dedicated Control Channel (PDCCH)).

Reception module 7020 may receive information sent by the RAN on the downlink channels such as the Physical Downlink Shared Channel (PDSCH) and Physical Downlink Control Channel (PDCCH) and inform the response module 7030 of the reception status of that information. For example, received sub-frames may be decoded at the reception module (and any FEC correction may be done here as well) and an indication of whether the sub-frame should be ACK'ed, NACK'ed, or DTX'ed may be sent to the response module 7030. Reception module 7020 may also pass various communication parameters to the response module 7030 such as the size of the bundling window and the last received DAI for that window.

Response module 7030 may inform the transmission module 7010 of the appropriate response parameters (e.g., PUCCH resource, RM code bits, constellation) according to the tables in FIG. 1 and FIG. 2 (continued on FIG. 2A) based upon the LDAI, the bundling window size and the like. For example, the response module 7030 may make a determination that a number of received downlink assignments is less than a response bundling window size and based upon that determination, set the reception status of each received downlink assignment based on whether a frame associated with the particular received downlink assignment was successfully received and setting the reception status of a frame in the bundling window that did not have a corresponding downlink assignment to a predetermined value. For example, the response module may determine for each index j for a plurality of downlink sub-frames in a response bundling window if one or more received downlink assignment index (DAI) values is equal to j+p. Determining a reception status (ACK/NACK/DTX) of the sub-frame corresponding to j responsive to determining that one of the one or more DAI values is equal to j+p. Setting the reception status of the sub-frame corresponding to j to a predetermined value responsive to determining that none of the one or more DAI values is equal to j+p. Where p is a constant (e.g., 0 or 1), where the one or more DAT values is received over the Physical Downlink Control Channel (PDCCH), where j≤M−1, and where M is a number of sub-frames in a HARQ bundling window. The response module 7030 may also be called a HARQ module and may then instruct the transmission module 7010 to transmit the appropriately determined response. In some examples, the variable p may be equal to zero if there is a Physical Downlink Shared Channel (PDSCH) transmission on the primary cell without a corresponding PDCCH detected within the bundling window, otherwise p may be one. Therefore, the value p can represent whether a semi-persistent scheduling (SPS) PDSCH without the corresponding PDCCH exists within a bundling window or not. Note that while the specification describes a PDCCH with a DAI value for a scheduled downlink frame, the disclosure may also be used when the UE receives a PDCCH indicating a downlink Semi-Persistent Scheduling (SPS) release message which also includes a DAI value.

FIG. 7 also shows a partial functional diagram of an eNodeB 7100 (more components not shown may be included). eNodeB 7100 includes a transmission module 7110 which transmits user data and control data on one or more channels. For example, user data or control data may he transmitted on a Physical Dedicated Control Channel (PDCCH) or a Physical Dedicated Shared. Channel (PDSCH). The transmission module 7110 may schedule frames for transmission and signal the UE on the PDCCH. The transmission module 7110 may also transmit the DAT in the PDCCH. The reception module 7120 may receive control and user data on the uplink communication channels such as the Physical Uplink Control Channel (PUCCH) and the Physical Uplink Shared Channel (PUSCH). Reception module 7120 may receive the HARQ responses from the UE to the downlink sub-frames (e.g., the ACK-NACK-DTX responses). In response to this information, the reception module may indicate to the transmission module that certain data may need to be retransmitted. The reception module 7120 may decode the response based on determining which PUCCH resource the response was received upon, the received constellation bits, and the received RM codes. The reception module 7120 may also determine that the last DAI value in the bundling window was less than the number of sub-frames in the bundling window and that one or more of the ACK/NACK/DTX of the sub-frames should be ignored as not representing an actual transmission.

Figure 8:
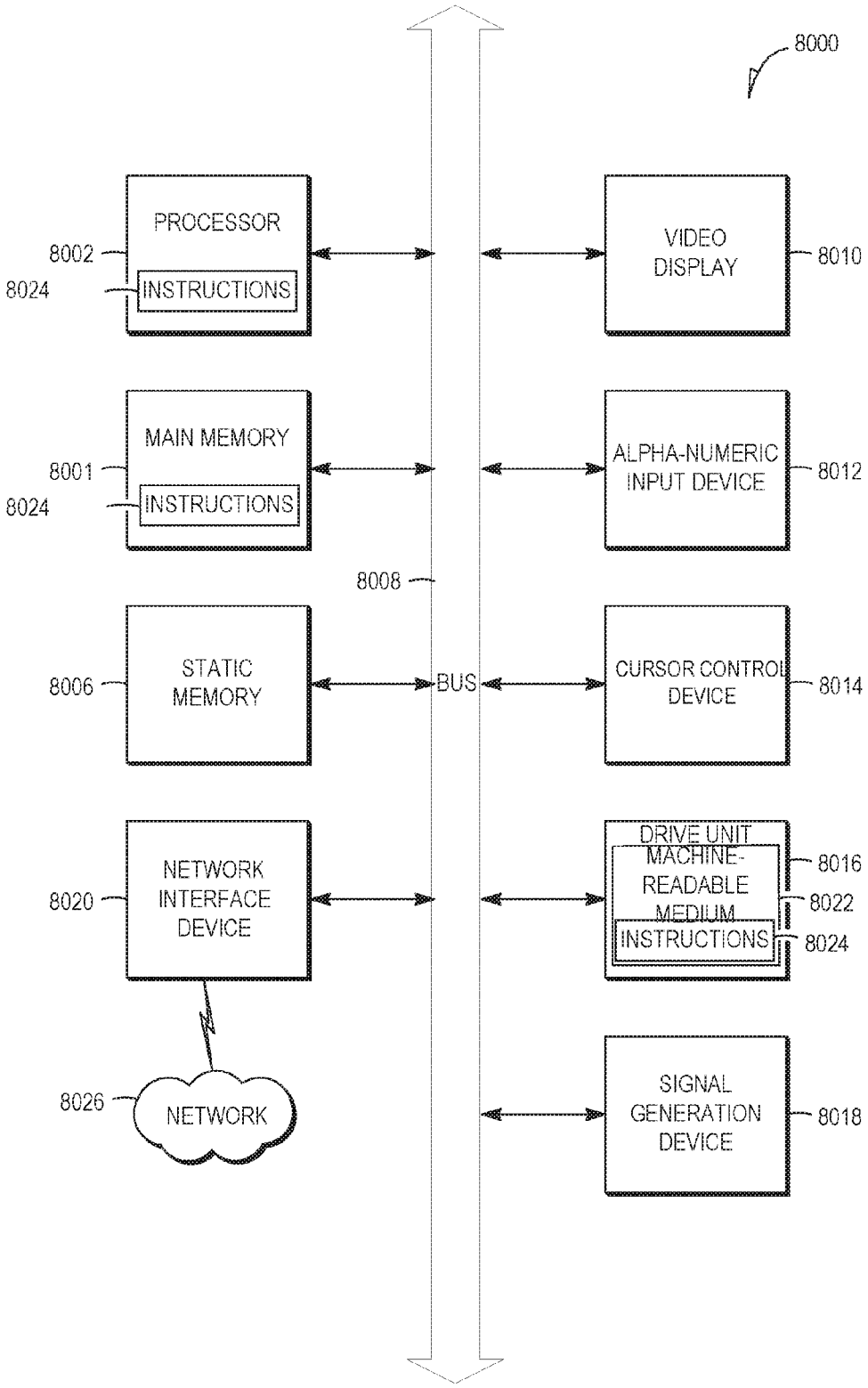
FIG. 8 shows a block diagram of a machine according to some examples of the present disclosure.

FIG. 8 illustrates a block diagram of an example machine 8000 upon which any one or more of the techniques (e.g., methodologies) discussed herein can be performed. The LTE, the RAN (including the eNodeBs) or the EPC may be or include parts of, machine 8000. In alternative embodiments, the machine 8000 can operate as a standalone device or can be connected (e.g., networked) to other machines. In a networked deployment, the machine 8000 can operate in the capacity of a server machine, a client machine, or both in server-client network environments. In an example, the machine 8000 can act as a peer machine in peer-to-peer (P2P) (or other distributed) network environment. The machine 8000 can be a personal computer (PC), a tablet PC, a set-top box (STB), a Personal Digital Assistant (PDA), a mobile telephone (such as a UE), a web appliance, a wireless base station, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 8000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Machine (e.g., computer system) 8000 can include a hardware processor 8002 (e.g., a central processing unit (CPU), a graphics processing unit (GPU), a hardware processor core, or any combination thereof), a main memory 8004 and a static memory 8006, some or all of which can communicate with each other via a bus 8008. The machine 8000 can further include a display unit 8010, an alphanumeric input device 8012 (e.g., a keyboard), a user interface (UI) control device 8014, and/or other input devices. In an example, the display unit 8010 and UI control device 8014 can be a touch screen display. The machine 8000 can additionally include a storage device (e.g., drive unit) 8016, a signal generation device 8018 (e.g., a speaker), and a network interface device 8020.

The storage device 8016 can include a machine-readable medium 8022 on which is stored one or more sets of data structures or instructions 8024 (e.g., software) embodying or utilized by any one or more of the techniques or functions described herein. The instructions 8024 can also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 can constitute machine readable media.

While the machine-readable medium 8022 is illustrated as a single medium, the term "machine readable medium" can include a single medium or multiple media (e.g., a centralized or distributed database, and/or associated caches and servers) that configured to store the one or more instructions 8024.

The term "machine-readable medium" can include any tangible medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 8024 can further be transmitted or received over a communications network 8026 using a transmission medium via the network interface device 8020. Network interface device 8020 may connect the machine 8000 to a network of other machines in order to communicate with the other machines in the network by utilizing any one of a number of transfer protocols (e.g., frame relay, Internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old. Telephone (POTS) networks, and wireless data networks (e.g., Institute of Electrical and Electronics Engineers (IEEE) 802.11 family of standards known as IEEE 802.16 family of standards known as WiMax®), peer-to-peer (P2P) networks, among others, In an example, the network interface device 8020 can include one or more physical jacks (e.g., Ethernet, coaxial, or phone jacks) or one or more antennas to connect to the communications network 8026. In an example, and as shown in FIG. 8, the network interface device 8020 can include a plurality of antennas (not shown) to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 8000, and includes digital or analog communications signals or other intangible medium to facilitate communication of such software.

OTHER NOTES AND EXAMPLES

Example 1

Disclosed is a User Equipment (UE) comprising a response module arranged to receive one or more downlink assignments of a bundling window over a wireless downlink control channel; set a reception status for each sub-frame of a downlink data channel in the bundling window based on whether the sub-frame on the downlink data channel was associated with a particular one of the downlink assignments and based upon whether the sub-frame was successfully received; and set a reception status of sub-frames of the downlink data channel in the bundling window that did not have a corresponding downlink assignment to a predetermined value; and a transmission module arranged to transmit a response, the response based upon the reception statuses set by the response module.

Example 2

The UE of example 1, wherein the reception status is one of: acknowledgement (ACK), negative acknowledgement (NACK), and Discontinuous Reception (DRX).

Example 3

The LT of any one of examples 1-2, wherein the predetermined value is a value indicating a discontinuous transmission (DTX).

Example 4

The LIE of any one of examples 1-3, wherein the is arranged to operate in a Time Division Duplex (TDD) mode and wherein the transmission module is arranged to transmit the response using a Physical Uplink Control Channel (PUCCH) format 1b.

Example 5

The UE of any one of examples 1-4, wherein the bundling window is greater than 2 sub-frames.

Example 6

The UE of any one of examples 1-5, wherein the transmission module is arranged to transmit the response by selecting a PUCCH uplink resource, a constellation, and a set of code input bits based upon the reception statuses.

Example 7

The UE of any one of examples 1-6, wherein the UE is arranged to communicate with a wireless network using a Long Term Evolution (LTE) family of standards.

Example 8

The UE of any one of examples 1-7, wherein the UE is arranged to utilize carrier aggregation with two serving cell configurations.

Example 9

Disclosed is a method comprising determining for each index j for a plurality of downlink sub-frames if one or more received downlink assignment index (DAI) values are equal to j+p, the one or more DAI values received over a Physical Downlink Control Channel (PDCCH), where $j \leq M-1$, M being a number of sub-frames in a HARQ bundling window, wherein p is a constant; setting the reception status of the sub-frame corresponding to j to a predetermined value responsive to determining that none of the one or more DAI values is equal to j+1; and transmitting the reception status of each of the plurality of downlink sub-frames j in the bundling window M.

Example 10

The method of example 9, wherein the predetermined value is a value indicating a discontinuous transmission (DTX).

Example 11

The method of any one of examples 9-10, comprising: determining if there is a Primary Downlink Shared Channel (PDSCH) transmission on a primary cell without a corresponding PDCCH detected within the bundling window; responsive to determining that there is a PDSCH without a corresponding PDCCH, setting p to 0; responsive to determining that there are no PDSCH without a corresponding PDCCH, setting p to 1.

Example 12

The method of any one of examples 9-11, wherein the reception statuses are transmitted using a Physical Uplink Control Channel (PUCCH) format 1b.

Example 13

The method of any one of examples 9-12, comprising transmit the reception statuses by at least selecting a PUCCH uplink resource, a constellation, and a set of code input bits based upon the reception statuses.

Example 14

Disclosed is a User Equipment (UE) comprising: a Hybrid Automatic Repeat Request (HARQ) module arranged to: for each index j for a plurality of downlink sub-frames: determine if one or more received downlink assignment index (DAI) values is equal to j+p, where p is a constant, the one or more DAI values received over a Physical Dow-Mink Control Channel (PDCCH), where $j \leq M-1$, and where M is a number of sub-frames in a HARQ bundling window, determine a reception status of the sub-frame corresponding to j responsive to determining that one of the one or more DAI values is equal to j+p, and setting the reception status of the sub-frame corresponding to j to a predetermined value responsive to determining that none of the one or more DM values is equal to j+p; and a transmission module arranged to transmit the reception status of each of the plurality of downlink sub-frames j in the bundling window M.

Example 15

The UE of example 14, wherein the reception status is one of acknowledgement (ACK), negative acknowledgement (NACK), and Discontinuous Reception (DTX).

Example 16

The UE of any one of examples 14-15, wherein the predetermined value is a value indicating a discontinuous transmission (DTX).

Example 17

The UE of any one of examples 14-16, wherein the predetermined value is a value different from a value indicating an ACK, a NACK, and a DTX.

Example 18

The UE of any one of examples 14-17, wherein the predetermined value is a value chosen at random from one of a value indicating an ACK, a NACK, and a DTX.

Example 19

The UE of any one of examples 14-18, wherein the UE is arranged to operate in a Time Division Duplex (TDD) mode.

Example 20

The UE of any one of examples 14-19, wherein the UE is arranged to multiplex HARQ reception statuses.

Example 21

The UE of any one of examples 14-20, wherein the transmission module is arranged to transmit the reception statuses using a Physical Uplink Control Channel (PUCCH) format 1b.

Example 22

The UE of any one of examples 14-21, wherein the HARQ module is further arranged to: determine if there is a Primary Downlink Shared. Channel (PDSCH) transmission on a primary cell without a corresponding PDCCH detected within the bundling window; responsive to determining that there is a PDSCH without a corresponding PDCCH, setting p to 0; responsive to determining that there are no PDSCH without a corresponding PDCCH, setting p to 1.

Example 23

The UE of any one of examples 14-22, wherein the transmission module is arranged to transmit the reception status by selecting a PUCCH uplink resource, a constellation, and a set of code input bits based upon the reception statuses.

Example 24

The UE of any one of examples 14-23, wherein the UE is arranged to communicate with a wireless network using a Long Term Evolution (LTE) family of standards.

What is claimed is:

[1. A User Equipment (UE) comprising:

processing circuitry arranged to:

determine that a downlink assignment index (DAI) is not equal to j+p, where p is a constant and j is the index of a downlink subframe; and transmission circuitry arranged to:

transmit a HARQ reception status of Discontinuous Reception responsive to the determination.]

[2. The UE of claim 1, further comprising receiver circuitry, and wherein the receiver circuitry is arranged to receive the DAI in the downlink subframe.]

[3. The UE of claim 2, wherein the receiver circuitry is further configured to:

receive the DAI in a downlink Semi-Persistent Scheduling (SPS) release message over the PDCCH.]

[4. The UE of claim 1, wherein the receiver circuitry is further configured to:

receive the DAI over a Physical Downlink Control Channel (PDCCH).]

[5. The UE of claim 4, wherein the transmission circuitry is configured to transmit the HARQ reception status responsive to receiving the SPS release message.]

[6. The UE of claim 1, further comprising:

a touchscreen display.]

[7. The UE of claim 1, further comprising:

a file storage.]

[8. An apparatus comprising:

means for receiving a downlink sub-frame, the downlink sub-frame having an index value j and a-downlink assignment index (DAI);

means for determining that the DAI is not equal to j+p, where p is a constant; and means for transmitting a HARQ reception status of Discontinuous Reception (DTX) for the downlink sub-frame in response to the determination.]

[9. The apparatus of claim 8, further comprising:

means for determining if there is a downlink shared channel transmission on a primary cell without a corresponding downlink control channel in a bundling window, the bundling window comprising M downlink sub-frames;

means for responsive to determining that there is a downlink shared channel without a corresponding downlink control channel, setting p to 0; and means for responsive to determining that there are no downlink shared channels without a corresponding downlink control channel, setting p to 1.]

[10. The apparatus of claim 8, wherein the HARQ reception status is transmitted using a Physical Uplink Control Channel (PUCCH) format 1b.]

[11. The apparatus of claim 8, wherein transmitting the HARQ reception status includes selecting at least one of a PUCCH uplink resource, a constellation, or a set of code input bits based upon the HARQ reception status.]

*12. A user equipment (UE) comprising:*

*processing circuitry arranged to:*

*receive one or more downlink assignment index (DAI) values from a Hybrid Automatic Repeat Request (HARQ) bundling window having M sub-frames, wherein M is greater than one, wherein a last of the one or more DAI values is less than M;*

*for an index j of a HARQ Acknowledgement (HARQ-ACK) feedback:*

*determine if any of the one or more DAI values is equal to j+p, wherein p is a constant equal to zero or one; and*

*if it is determined that none of the one or more DAI values is equal to j+p, setting a reception status value corresponding to the index j equal to Discontinuous Transmission (DTX); and*

*transmission circuitry arranged to transmit the HARQ-ACK feedback, including the reception status value.*

*13. The UE of claim 12, wherein the UE is arranged to operate in a Time Division Duplex (TDD) mode.*

*14. The UE of claim 12, wherein the processing circuitry is further arranged to:*

*if it is determined that any of the one or more DAI values is equal to j+p, setting the reception status value corresponding to the index j equal to one of: acknowledgement (ACK), negative acknowledgement (NACK), and DTX.*

*15. The UE of claim 12, wherein the transmission circuitry is arranged to transmit the HARQ-ACK feedback using a Physical Uplink Control Channel, PUCCH, format 1b of 3GPP Long Term Evolution (LTE).*

*16. The UE of claim 12, wherein the processing circuitry is further arranged to:*

*determine a physical downlink channel relationship between a Physical Downlink Shared Channel (PDSCH) transmission on a primary cell and a corresponding Physical Downlink Control Channel (PDCCH) detected within the bundling window;*

*responsive to determining that there is a PDSCH transmission on a primary cell without a corresponding PDCCH detected within the bundling window, setting p to 0;*

*responsive to determining that there is no PDSCH transmission on a primary cell without a corresponding PDCCH detected within the bundling window, setting p to 1.*

*17. The UE of claim 12, wherein the transmission circuitry is arranged to transmit the HARQ-ACK feedback by selecting a PUCCH uplink resource, a constellation, and a set of code input bits based upon the HARQ-ACK feedback.*

*18. A method of communicating reception status, the method comprising: by a user equipment (UE):*

*receiving one or more downlink assignment index (DAI) values from a Hybrid Automatic Repeat Request (HARQ) bundling window having M sub-frames, wherein M is greater than one, wherein a last of the one or more DAI values is less than M;*

*for an index j of a HARQ Acknowledgement (HARQ-ACK) feedback:*

*determining if any of the one or more DAI values is equal to j+p, wherein p is a constant equal to zero or one; and*

*if it is determined that none of the one or more DAI values is equal to j+p, setting a reception status value corresponding to the index j equal to Discontinuous Transmission (DTX); and*

*transmitting the HARQ-ACK feedback, including the reception status value.*

*19. The method of claim 18, wherein the UE is arranged to operate in a Time Division Duplex (TDD) mode.*

*20. The method of claim 18, further comprising:*

*in response to determining that any of the one or more DAI values is equal to j+p, setting the reception status value corresponding to the index j equal to one of: acknowledgement (ACK), negative acknowledgement (NACK), and DTX.*

*21. The method of claim 18, wherein the HARQ-ACK feedback is transmitted using a Physical Uplink Control Channel, PUCCH, format 1b of 3GPP Long Term Evolution (LTE).*

*22. The method of claim 18, further comprising:*

*determining a physical downlink channel relationship between a Physical Downlink Shared Channel (PDSCH) transmission on a primary cell and a corresponding Physical Downlink Control Channel (PDCCH) detected within the bundling window;*

*responsive to determining that there is a PDSCH transmission on a primary cell without a corresponding PDCCH detected within the bundling window, setting p to 0;*

*responsive to determining that there is no PDSCH transmission on a primary cell without a corresponding PDCCH detected within the bundling window, setting p to 1.*

*23. The method of claim 18, further comprising selecting a PUCCH uplink resource, a constellation, and a set of code input bits based upon the HARQ-ACK feedback for transmission of the HARQ ACK feedback.*

*24. A non-transitory computer readable medium storing software instructions executable by at least one processor of user equipment (UE) to cause the UE to:*

*receive one or more downlink assignment index (DAI) values from a Hybrid Automatic Repeat Request (HARQ) bundling window having M sub-frames,*

*wherein M is greater than one, wherein a last of the one or more DAI values is less than M;*

*for an index j of a HARQ Acknowledgement (HARQ-ACK) response:*

*determine if any of the one or more DAI values is equal to j+p, wherein p is a constant equal to zero or one; and*

*if it is determined that none of the one or more DAI values is equal to j+p, set a reception status value corresponding to the index j equal to Discontinuous Transmission (DTX); and*

*transmit the HARQ-ACK response, including the reception status value.*

*25. The non-transitory computer readable medium of claim 24, wherein the software instructions are executable to cause the UE to operate in a Time Division Duplex (TDD) mode.*

*26. The non-transitory computer readable medium of claim 24, wherein the software instructions are executable to cause the UE to:*

*in response to determining that any of the one or more DAI values is equal to j+p, set the reception status value corresponding to the index j equal to one of: acknowledgement (ACK), negative acknowledgement (NACK), and DTX.*

*27. The non-transitory computer readable medium of claim 24, wherein the software instructions are executable to cause the UE to transmit the HARQ-ACK response using a Physical Uplink Control Channel, PUCCH, format 1b of 3GPP Long Term Evolution (LTE).*

*28. The non-transitory computer readable medium of claim 24, wherein the software instructions are executable to cause the UE to:*

*determine a physical downlink channel relationship between a Physical Downlink Shared Channel (PDSCH) transmission on a primary cell and a corresponding Physical Downlink Control Channel (PDCCH) detected within the bundling window;*

*responsive to determining that there is a PDSCH transmission on a primary cell without a corresponding PDCCH detected within the bundling window, set p to 0;*

*responsive to determining that there is no PDSCH transmission on a primary cell without a corresponding PDCCH detected within the bundling window, set p to 1.*

*29. The non-transitory computer readable medium of claim 24, wherein the software instructions are executable to cause the UE to transmit the HARQ-ACK response by selecting a PUCCH uplink resource, a constellation, and a set of code input bits based upon the HARQ-ACK response.*

* * * * *